M. M. BALLENGER.
SEED PLANTER.
APPLICATION FILED NOV. 19, 1915.

1,207,467.

Patented Dec. 5, 1916.
2 SHEETS—SHEET 1.

Inventor
Minor M. Ballenger

Witnesses

By Victor J. Evans
Attorney

M. M. BALLENGER.
SEED PLANTER.
APPLICATION FILED NOV. 19, 1915.
1,207,467.
Patented Dec. 5, 1916.
2 SHEETS—SHEET 2.
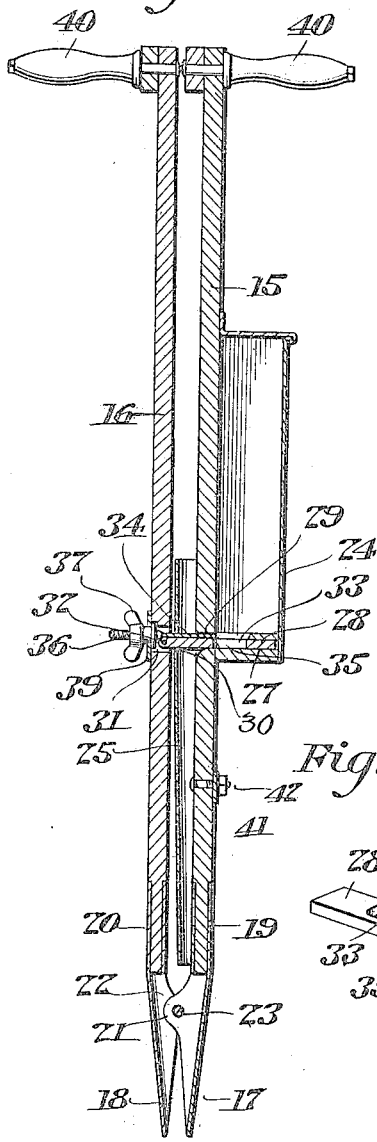
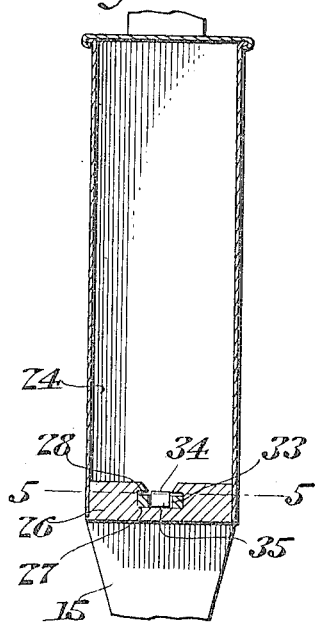
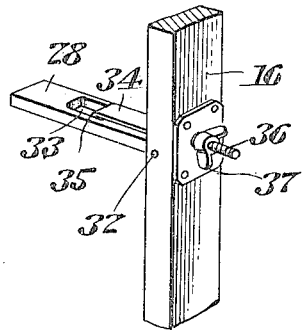
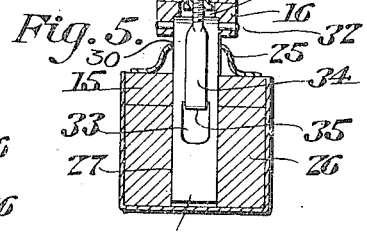
Inventor
Minor M. Ballenger
By Victor J. Evans
Attorney
Witnesses

UNITED STATES PATENT OFFICE.

MINOR M. BALLENGER, OF CLAYTON, WEST VIRGINIA.

SEED-PLANTER.

1,207,467. Specification of Letters Patent. Patented Dec. 5, 1916.

Application filed November 19, 1915. Serial No. 62,367.

*To all whom it may concern:*

Be it known that I, MINOR M. BALLENGER, a citizen of the United States, residing at Clayton, in the county of Summers and State of West Virginia, have invented new and useful Improvements in Seed-Planters, of which the following is a specification.

This invention relates to hand planters for planting seed, such as corn and the like, and it has particular reference to that type or class of hand planters that include two pivotally connected limbs having dirt engaging blades to form an opening in the ground, one of said limbs carrying a seed box or receptacle and a slide operating therein, said slide being connected with and actuated by the other limb, said limbs being provided with handles whereby the planter is carried and operated.

One object of the present invention is to produce a double planter of the general type referred to, the same embodying two planter units that are adjustably connected with a single pair or set of operating handles and by means of which two seed charges may be deposited at a single operation, said charges being placed any desired distance apart.

A further object of the invention is to simplify and improve the detailed construction of the planter units.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
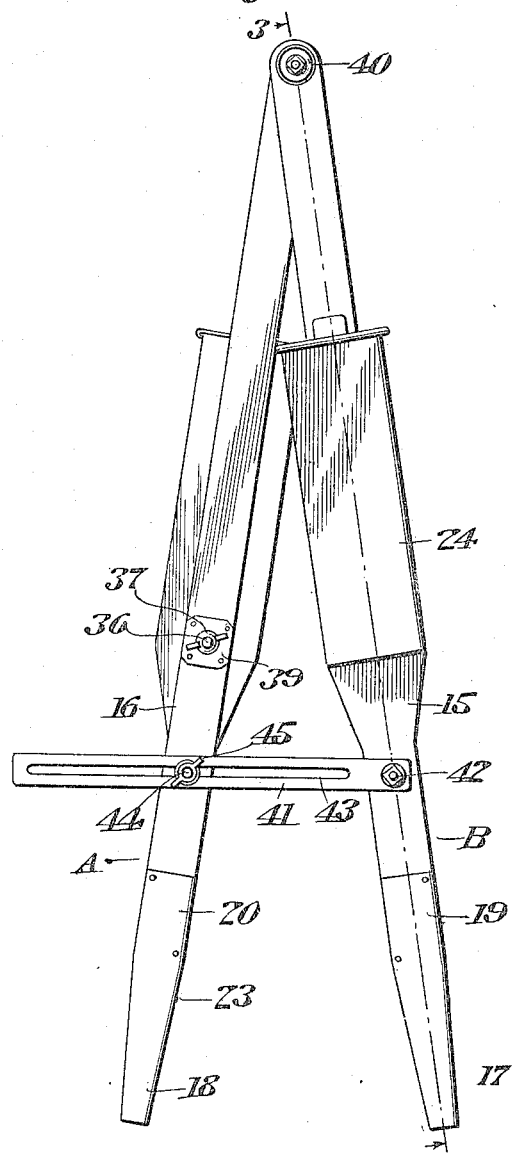
Figure 2:
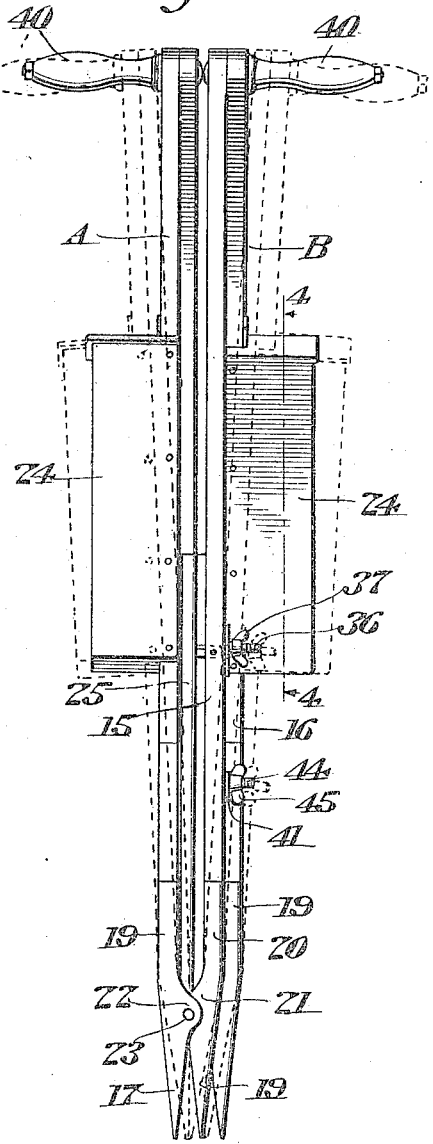

In the drawings,—Figure 1 is a view in side elevation of a planter constructed in accordance with the invention, the planter units being shown adjusted for operation to deposit charges of seed some distance apart. Fig. 2 is an end view of the planter. Fig. 3 is a vertical sectional view through one of the planter units taken on the line 3—3 in Fig. 1. Fig. 4 is a sectional detail view taken on the line 4—4 in Fig. 2. Fig. 5 is a sectional detail view taken on the line 5—5 in Fig. 4. Fig. 6 is a perspective detail view of one of the seed slides and portions of the parts adjacent thereto.

Corresponding parts in the several figures are denoted by like characters of reference.

In the construction of the improved planter two similar units A, B are employed. Each unit comprises a pair of limbs 15, 16 made preferably of wood and provided at their lower ends with ground engaging blades 17, 18, said blades being provided with sockets 19, 20 for the reception of the lower ends of the limbs 15, 16. The respective sockets are provided with overlapping flanges 21, 22 that are connected together by pivot members 23 enabling the blades 17, 18 to be moved together and apart by proper manipulation of the limbs.

One limb 15 of each planter unit is equipped with a seed box 24 and with a seed duct 25, said seed box being mounted on the external face, and the seed duct being secured on the inner face of the limb. The bottom member 26 of the seed box is provided with a groove 27 in which a seed slide 28 is guided, said seed slide extending also through an aperture 29 in the limb 15 and through an aperture 30 in the wall of the seed duct 25. The limb 16 is provided with a recess 31 in which the seed slide 28 is pivotally secured by a pivot member 32. The seed slide has the customary seed pocket or aperture 33, and it will be readily understood that by actuating the limbs of the planter unit the seed slide may be reciprocated so as to bring the seed pocket alternately in registry with the seed box and with the seed duct, so that seed gravitating into and filling the seed pocket at one limit of the movement of the seed slide will at the other limit of the movement of said slide be free to drop through the seed duct and to the ground where an opening for the reception of the seed has been prepared by the blades 17, 18.

For the purpose of varying the size of the seed pocket a gage 34 is provided, said gage having at one end a flange 35 operating in the seed pocket 33 and at the other end a screw threaded stem 36 that extends through the limb 16 and is provided with a wing nut 37. The nut is provided with an annular groove 38 engaged by a retaining plate 39 which is secured on the external face of the limb 16, thus connecting the nut with the limb for swiveling movement so that, by rotating said nut, the gage will be moved longitudinally with respect to the seed slide, thereby causing the area of the seed pocket to be varied.

The limbs of the respective planter units are overlapped at their upper ends, the limb 15 of each unit being juxtaposed to the limb 16 of the mating unit, said limbs 15, 16 being pivotally connected with handles 40, two of said handles being provided and each handle being pivotally connected with two limbs 15, 16 of the respective planter units. It will be seen that by this construction the two planter units may be moved about the axes of the handles with which they are pivotally connected, it being understood that said handles are disposed in axial alinement with each other, thus permitting the lower ends of the respective units to be spaced varriously apart. For the purpose of retaining the two units in position at various adjustments, one of said units A is provided with a brace member 41 connected therewith by a pivot 42, said brace member having a slot 43 engaging a bolt 44 connected with the planter unit B and carrying a nut 45 which may be tightened upon the brace member 41. By this construction the lower extremities of the planter units may be variously spaced for operation, while when not in use the planter units may be folded close together.

It will be readily seen that by means of the handles 40 the planter units may be simultaneously operated, it being understood that in operation the blades at the lower ends of the two units are inserted into the ground while the upper ends of the limbs of the respective units are spaced apart, causing the blades to lie close together. While the blades are thus inserted in the ground, the handles are actuated to move the upper ends of the limbs of the respective units in the direction of each other, thereby moving the blades 17, 18 apart and permitting a charge of seed to drop from the seed duct into the opening thus formed in the ground. The planter units are now lifted from the ground, and the handles are manipulated to throw the upper ends of the limbs apart from each other, thus bringing the blades together so as to obstruct the lower extremities of the seed ducts. By the same operation the slides of the respective planter units will be moved to place the seed ducts into which charges of seed have gravitated from the seed boxes in alinement with the seed ducts into which the charges are dropped ready for planting.

By the improved seed planter it is obvious that two charges of seed may be deposited at each operation, thus enabling the planting to be performed in just one-half of the time required when a single planter is used. The charges of seed may be deposited as close together or as far apart as may be desired, and it is obvious that different seeds, such as corn and pumpkin seed may be planted at each operation, the pumpkin seed being spaced any desired distance apart from the hill of corn.

Having thus described the invention, what is claimed as new, is:—

A hand planter comprising two similar units each including pivotally connected limbs having ground engaging blades at their lower ends, said limbs being overlapped at their upper ends, and handles with which the limbs of each unit are pivotally connected to enable the limbs of the two units to be simultaneously actuated.

In testimony whereof I affix my signature in presence of two witnesses.

MINOR M. BALLENGER.

Witnesses:
G. F. BALLENGER,
D. C. BALLENGER.

Copies of this patent may be obtained for five cents each, by addressing the "Commissioner of Patents, Washington, D. C."